No. 609,809. Patented Aug. 30, 1898.
T. D. HOLLICK.
GEARING FOR TRANSMISSION OF POWER.
(Application filed Dec. 23, 1897.)
(No Model.)
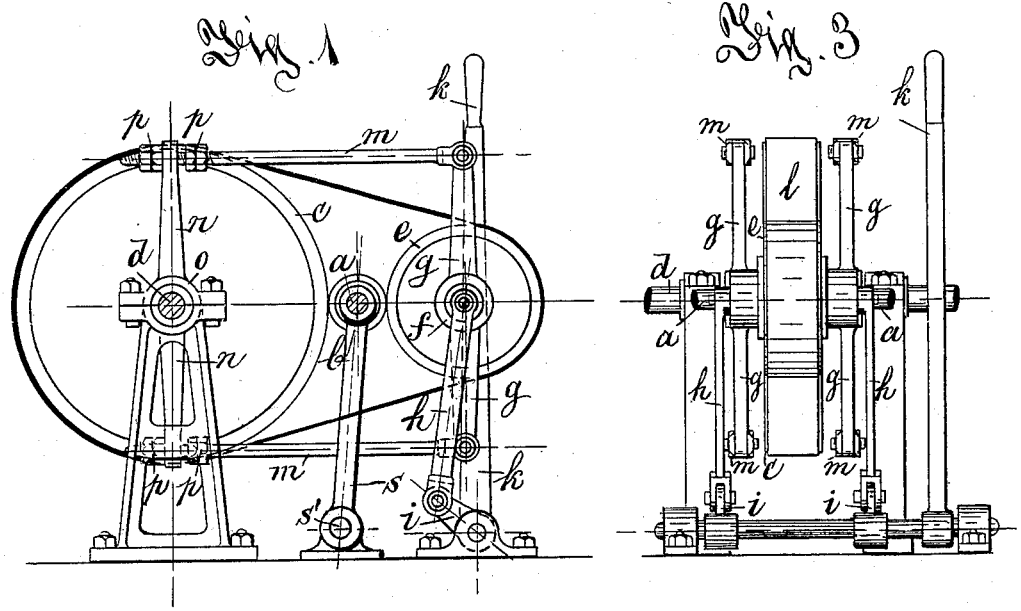
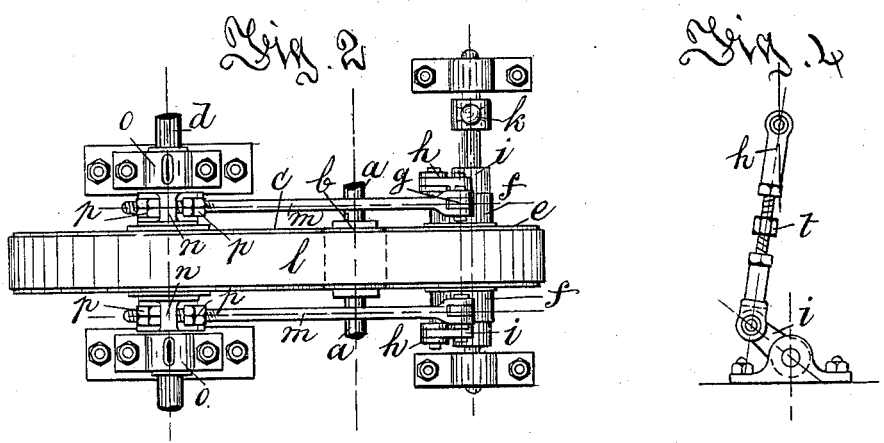

UNITED STATES PATENT OFFICE.

THOMAS DRAKE HOLLICK, OF LONDON, ENGLAND, ASSIGNOR OF ONE-THIRD TO JOHN CHARLES HOWELL, OF SAME PLACE.

GEARING FOR TRANSMISSION OF POWER.

SPECIFICATION forming part of Letters Patent No. 609,809, dated August 30, 1898.

Application filed December 23, 1897. Serial No. 663,237. (No model.) Patented in England December 19, 1892, No. 23,402.

*To all whom it may concern:*

Be it known that I, THOMAS DRAKE HOLLICK, a subject of the Queen of Great Britain, residing at London, England, have invented certain new and useful Improvements in Gearing for the Transmission of Power, (for which I have obtained a patent in Great Britain numbered 23,402 and bearing date the 19th day of December, 1892,) of which the following is a specification.

My invention relates to improvements in gearing in which the transmission of power from a driving-shaft to a driven one is effected by means of pulleys of suitable diameter and width fixed upon the shafts, their peripheries being in contact and being pressed together by means of weights, levers, screws, springs, or other equivalent means.

The objects of my improvements are to reduce the friction of the shafts in their bearings, to facilitate the starting and stopping of the shaft which is driven, and to provide means for very delicate adjustment of the pressure or friction.

My invention is particularly applicable for the transmission of power from electromotors to their work, as "constant-speed" motors may be used, the work being stopped and started without interfering with the speed of the motor.

In order that my invention may be clearly understood, reference is made to the accompanying drawings, in which—

Figure 1 is a side view, Fig. 2 a top view, and Fig. 3 an end view, of a machine for transmitting power from an electromotor revolving at a high speed to another shaft revolving at a much lower speed which may be connected with the hoisting mechanism of a crane or other apparatus to be driven, the movement being stopped and regulated, as required, instantly and without trouble by an attendant.

Similar letters refer to similar parts throughout the several views.

$a$ is the shaft of an electric motor provided with a small friction-pulley $b$. This pulley drives the larger pulley $c$, the shaft $d$ of which actuates the crane or other machinery which is to be driven.

$e$ is a third pulley, the shaft of which revolves in bearings $ff$ in the levers $gg$, which can be raised or lowered for a short distance by means of the connecting-rods $h$ (which are made accurately adjustable in length, as shown at $t$ in Fig. 4) and levers $i$, operated by an attendant by the lever or handle $k$. The pulleys $c$ and $e$ are connected by an endless belt $l$, which passes over them and the greatest tension upon which exists when the pulley $e$ is lowered until the centers of the axles of the three pulleys are in the same plane, as shown in the figures, this tension being sufficient to hold the pulleys $c$ and $e$ with sufficient force against the center pulley $b$.

When the pulley $e$ is raised by means of the lever $k$, the tension of the belt $l$ is reduced.

The ends of the levers $gg$ are prolonged sufficiently above and below the bearings and are connected by the adjustable bolts $mm$ with the ends of similar levers $nn$, the centers of which turn freely upon the shaft $d$ or upon suitable bosses carried by the bearings $oo$, in which the said shaft revolves. The ends of the bolts $mm$ are adjustable in the levers $nn$ (or in those $gg$) by means of nuts $pp$.

Preferably the bolts $mm$ are so adjusted that when the belt is at its tension for the pulley $c$ to be properly driven the axis of the pulley $e$ is very slightly above the plane of the axes of the pulleys $b$ and $c$, and there is then practically no friction between any of the shafts and their bearings except that due to rotation.

The outer nuts $p$ upon the bolts $m$ are so adjusted that they press against the levers $n$ when or just before the axis of $e$ comes into the same plane as the other two axes. By means of the lever $k$ the pulley $e$ can be raised to or from the plane of the centers of the axes, so as to vary the pressure on the driving wheel or pulley $b$ or take it off altogether. The driving-shaft $a$ is preferably arranged so that its bearings have a very slight lateral movement, as hereinafter explained, in order that when the pressure is removed it may come out of contact with the pulley $c$.

The arrangement shown enables me to use smaller gear than I should be otherwise able to use, and also (after the outer nuts $p$ have come into contact with the levers $n$) in case of a belt giving out or breaking I should still be able to go on driving, though not so efficiently as when the belt is in work.

The armature of the electric motor, which is not shown in the drawings, but may be of any suitable kind, is fixed upon the axle $a$, the bearings of which are carried upon the upper ends of vertical supporting-bars $s$, pivoted at their lower ends to lugs $s'$, as shown in Fig. 1, so that the axle, together with the entire electric motor and the driving-pulley $b$, can fall slightly away from the pulley $c$ when the pressure of the pulley $e$ is withdrawn, the entire electromotor being slightly inclined out of the perpendicular (as regards the point $s'$) for the purpose.

When the pulley $e$ is put in gear with the pulley $b$ by pressing it down, the reverse of the above-described action takes place, and the three pulleys may be pressed tightly together without any appreciable loss of power or strain on the bearings so long as the belt tension does the work; but the pulley $e$ is prevented by the rods $m$ and nuts $p$ from passing the center.

The novel arrangement described and illustrated is highly efficient for transmitting power from electromotors to their work and enables me to use constant-speed motors and to stop and start the work without interfering with the motor speed, and it affords means for very delicate adjustment, failing which the loss of power becomes considerable.

The details of my invention and the method of carrying it into operation may be varied more or less to suit varying circumstances and the different purposes to which it is applied. The shafts or axles may be used simply as means for transmitting motion to other shafts, driving machinery of any kind by means of beveled or other toothed wheels or drums and belts or other equivalent devices, or they may drive such machinery direct. Either of the shafts $a$ or $d$ may be made the driving-shaft, and other motive power may be used instead of an electromotor.

The apparatus may be arranged in any convenient position to suit the purpose to which it is to be applied, and by its use for many purposes great efficiency is obtained, accompanied by absence of wear and tear and simplicity of construction and operation.

I do not claim, broadly, the driving of a small pulley driven by the friction of two larger ones placed on each side of it, over which a belt passes, nor the mounting one of the pulleys out of the center line of the other two pulleys; but

What I claim as my invention, and desire to secure by Letters Patent, is—

1. In gearing for the transmission of power, the combination of a driving-wheel the periphery of which would be normally out of contact with the wheel to be driven and a third or pressing wheel, bearings for said wheel carried in connecting-rods and toggle-joints connecting said rods to the frame, the parts being so arranged that the pressing-wheel is adapted to be thrown in and out of contact so as to cause the driving and driven wheel to be pressed together or released from contact with each other, substantially as and for the purposes specified.

2. In gearing for the transmission of power, the combination of a driving-wheel the periphery of which would be normally out of contact with the wheel to be driven, a third or pressing wheel, bearings for said wheel carried in connecting-rods, toggle-joints connecting said rods to the frame the parts being so arranged that the pressing-wheel is adapted to be thrown in and out of contact so as to cause the driving and driven wheel to be pressed together or released from contact with each other and a belt or band passing around the outer wheels, substantially as and for the purposes set forth.

3. In gearing for the transmission of power, the combination of a driving-wheel the periphery of which would be normally out of contact with the wheel to be driven, a third or pressing wheel, bearings for said wheel carried in connecting-rods, toggle-joints connecting said rods to the frame, a lever for changing the position of the pressing-wheel, substantially as and for the purposes set forth.

4. The combination with a friction-pulley $b$ upon an axle $a$ turning in bearings, centers $s$ carrying said bearings and situated between two other friction-pulleys $c$ and $e$ one on each side of said friction-pulley $b$, the two other pulleys being surrounded by a flexible band $l$ by which they are held in contact with the central pulley, of the adjustable bearings $f$, $f$, bars $h\ h$ adjustable in length for the purpose of accurately adjusting the position of the adjustable pulley $e$, levers $i\ i$ and handle $k$ all as and for the purpose set forth.

5. In combination, a driving-wheel, a driven wheel, a pressing-wheel, levers $g\ g$, $n$, $n$, and the connecting-rods $m$, $m$, having adjustable nuts $p$, the positions of which are so adjusted that when the axis of the pressing-wheel is coming into the same plane as the axis of the driving and driven wheels the nuts $p$ come into operation and prevent the further separation of the axes of the two outer wheels substantially in the manner and for the purpose set forth and shown.

In testimony whereof I have hereunto set my hand in the presence of two subscribing witnesses.

THOMAS DRAKE HOLLICK.

Witnesses:
 FRED C. HARRIS,
 T. J. OSMAN.